(12) United States Patent
Moulin et al.

(10) Patent No.: US 11,548,419 B2
(45) Date of Patent: Jan. 10, 2023

(54) SEAT ASSEMBLY (71) Applicant: Lear Corporation, Southfield, MI (US)

(72) Inventors: Antoine Moulin, Aurec-sur-Loire (FR); Patrick Faye, Roche la Moliere (FR); Thibaud Condamin, Orlienas (FR)

(73) Assignee: LEAR CORPORATION, Southfield, MI (US)

( * ) Notice: Subject to any disclaimer, the term of this patent is extended or adjusted under 35 U.S.C. 154(b) by 62 days.

(21) Appl. No.: 16/898,102

(22) Filed: Jun. 10, 2020

(65) Prior Publication Data
US 2020/0398712 A1    Dec. 24, 2020

Related U.S. Application Data

(60) Provisional application No. 62/862,771, filed on Jun. 18, 2019.

(51) Int. Cl.
*B60N 2/30* (2006.01)
*B60N 2/07* (2006.01)
*B60N 2/90* (2018.01)
*B60N 2/08* (2006.01)

(52) U.S. Cl.
CPC ............. *B60N 2/3047* (2013.01); *B60N 2/07* (2013.01); *B60N 2/08* (2013.01); *B60N 2/3009* (2013.01); *B60N 2/3065* (2013.01); *B60N 2/938* (2018.02); *B60N 2002/952* (2018.02)

(58) Field of Classification Search
None
See application file for complete search history.

(56) References Cited

U.S. PATENT DOCUMENTS

| | | | | |
|---|---|---|---|---|
| 3,973,799 A * | 8/1976 | Berg | ................... | B60N 2/0292 297/341 |
| 4,846,520 A * | 7/1989 | Acuto | ...................... | B60N 2/12 296/65.09 |
| 4,936,535 A * | 6/1990 | Johansson | ............ | B60N 2/0707 297/344.1 |
| 5,037,054 A * | 8/1991 | McConnell | ........ | A47B 21/0314 248/284.1 |
| 6,123,380 A * | 9/2000 | Sturt | .................... | B60N 2/3011 296/65.09 |
| 9,315,137 B1 * | 4/2016 | Davis | ........................ | B64F 5/50 |
| 9,876,984 B2 * | 1/2018 | Massey | ................. | F16M 11/18 |
| 2002/0130542 A1 | 9/2002 | Ellerich et al. | | |

(Continued)

FOREIGN PATENT DOCUMENTS

| | | | | |
|---|---|---|---|---|
| DE | 4212589 A1 * | 10/1993 | ............... | B60N 2/12 |
| DE | 100 47 743 A1 | 4/2002 | | |

(Continued)

OTHER PUBLICATIONS

Chinese Office Action (with English Translation) dated Apr. 14, 2022, 15 Pages.

(Continued)

*Primary Examiner* — David E Allred
(74) *Attorney, Agent, or Firm* — Brooks Kushman P.C.

(57) ABSTRACT

A seat assembly having a seat bottom, a seat back, a seat track, and a rear mounting unit. The seat bottom may be pivotally mounted to the seat back. The seat back may be pivotally mounted to the rear mounting unit. The rear mounting unit may be moveably disposed on the seat track.

20 Claims, 10 Drawing Sheets

(56) References Cited

U.S. PATENT DOCUMENTS

| | | | |
|---|---|---|---|
| 2005/0006940 A1* | 1/2005 | Yoshida | B60N 2/065 |
| | | | 297/378.12 |
| 2005/0269830 A1 | 12/2005 | Epaud | |
| 2006/0033373 A1 | 2/2006 | Kammerer | |
| 2009/0256379 A1* | 10/2009 | Yamada | B60N 2/3047 |
| | | | 296/65.08 |
| 2010/0133871 A1* | 6/2010 | Matsumoto | B60N 2/22 |
| | | | 296/65.18 |
| 2010/0244524 A1* | 9/2010 | Kumazaki | B60N 2/2358 |
| | | | 297/341 |
| 2014/0167466 A1 | 6/2014 | Line et al. | |
| 2014/0353454 A1* | 12/2014 | Yamada | B60N 2/0818 |
| | | | 248/430 |
| 2014/0361592 A1* | 12/2014 | Kuno | B60N 2/06 |
| | | | 297/325 |
| 2016/0046210 A1* | 2/2016 | Nakamura | B60N 2/065 |
| | | | 297/344.1 |
| 2017/0001543 A1 | 1/2017 | Dlugokecki et al. | |
| 2017/0001546 A1 | 1/2017 | Keyser et al. | |
| 2017/0113575 A1* | 4/2017 | Epaud | B60N 2/3011 |
| 2017/0210250 A1 | 7/2017 | Luther | |
| 2017/0253146 A1* | 9/2017 | Cooley | B60N 2/123 |
| 2018/0029558 A1* | 2/2018 | Beauchemin | B60R 22/18 |
| 2018/0093597 A1* | 4/2018 | Namboodiri | B60R 22/26 |
| 2018/0244176 A1* | 8/2018 | Matsui | B60N 2/3047 |
| 2018/0319293 A1 | 11/2018 | Joshi et al. | |
| 2018/0334054 A1* | 11/2018 | Higuchi | B60N 2/06 |
| 2019/0000238 A1* | 1/2019 | Eskridge, III | A61G 7/0755 |
| 2019/0092191 A1* | 3/2019 | Bouzid | B60N 2/309 |
| 2020/0062148 A1* | 2/2020 | Yun | B60N 2/1695 |
| 2020/0337918 A1* | 10/2020 | Hwang | B60N 2/162 |
| 2021/0170918 A1* | 6/2021 | Kim | B60N 2/3045 |
| 2021/0261022 A1* | 8/2021 | Moulin | H01R 33/94 |
| 2021/0282991 A1* | 9/2021 | Yada | A61G 5/1059 |
| 2022/0161698 A1* | 5/2022 | Murafuji | B60N 2/146 |

FOREIGN PATENT DOCUMENTS

| | | | | |
|---|---|---|---|---|
| DE | 103 28 176 B3 | 3/2005 | | |
| DE | 10 2006 022 032 A1 | 12/2006 | | |
| DE | 10 2006 047 383 A1 | 4/2008 | | |
| DE | 10 2009 048 498 A1 | 4/2011 | | |
| DE | 10 2013 006 485 A1 | 11/2013 | | |
| DE | 112008003251 B4 | 7/2017 | | |
| FR | 2459740 A1 * | 1/1981 | | B60N 2/12 |
| FR | 2 943 986 A1 | 10/2010 | | |
| JP | 2000108746 A * | 4/2000 | | |
| WO | WO-2019096774 A2 * | 5/2019 | | B60N 2/12 |

OTHER PUBLICATIONS

Chinese Office Action Application No. 202010560795.7 dated Apr. 14, 2022, English Translation.

German Search Report (with English Machine Translation) dated Sep. 9, 2022, Application No. 10 2020 207 109.7, Applicant Lear Corporation, 10 Pages.

German Office Action Application No. 10 2020 207 409.7 dated Sep. 9, 2022, English Machine Translation.

DE 10 2013 006 485 A1, Abstract & Machine Translation.

DE 11 208 003 251 B4, US 2010/0244524 A1 (Previously Cited).

* cited by examiner

SEAT ASSEMBLY

CROSS-REFERENCE TO RELATED APPLICATIONS

This application claims the benefit of U.S. provisional application Ser. No. 62/862,771, filed Jun. 18, 2019, the disclosure of which is hereby incorporated in its entirety by reference herein.

TECHNICAL FIELD

This disclosure relates to a vehicle seat assembly that can pivot between multiple positions.

BACKGROUND

A stowable vehicle seat is disclosed in U.S. Patent Publication No. 2017/0001543.

SUMMARY

In at least one embodiment, a seat assembly is provided. The seat assembly may include a seat track, a rear mounting unit, a seat back, a seat bottom. The rear mounting unit may be moveably disposed on the seat track. The rear mounting unit may have a rear mounting unit latch mechanism that selectively couples the rear mounting unit to the seat track to inhibit movement of the rear mounting unit with respect to the seat track. The seat back may be pivotally mounted to the rear mounting unit along a seat back pivot axis. The seat bottom may be pivotally mounted to the seat back along a side link axis. A latch mechanism may selectively inhibit movement of the seat bottom with respect to the seat back.

In at least one embodiment, a seat assembly is provided. The seat assembly may include a seat track, a rear mounting unit, a seat back, a seat bottom, and a latch mechanism. The seat track may have a bottom side and a top side. The bottom side may be adapted to be mounted to a support member. The top side may be disposed opposite the bottom side. The rear mounting unit may be moveably disposed on the seat track. The rear mounting unit may have a roller and a rear mounting unit latch mechanism. The roller may be configured to roll along the top side of the seat track. The rear mounting unit latch mechanism may be received in the seat track and may selectively couple the rear mounting unit to the seat track to inhibit rolling of the rear mounting unit along the top side. The seat back may be pivotally mounted to the rear mounting unit. The seat bottom may be pivotally mounted to the seat back. The latch mechanism may selectively inhibit movement of the seat bottom with respect to the seat back.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
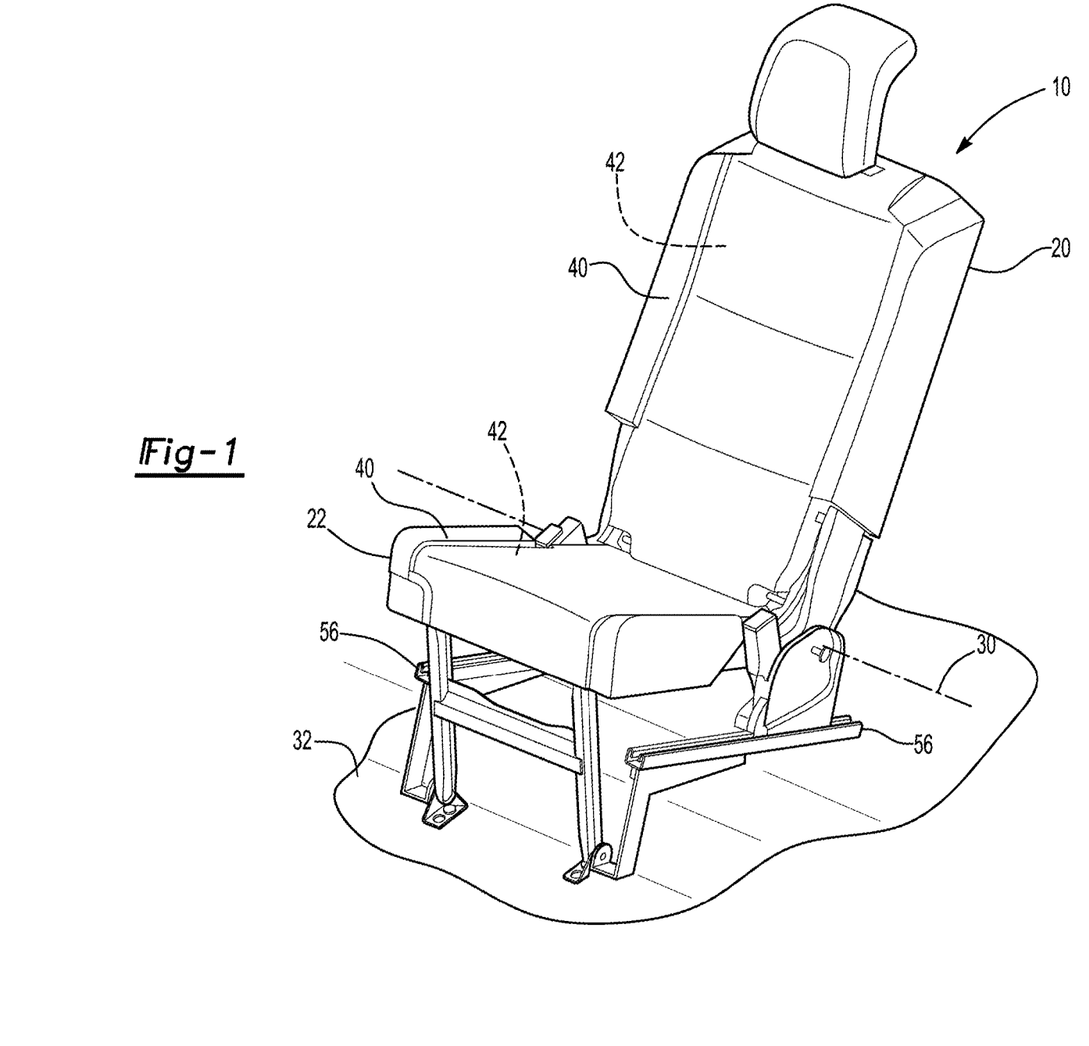
FIG. 1 is a perspective view of an example of a seat assembly.

Referring to FIG. 1, an example of a seat assembly 10 is shown. The seat assembly 10 may be provided with or configured for use with a vehicle, such as a motor vehicle like a car or truck. In at least one configuration, the seat assembly 10 may be configured as a rear seat that may be positioned behind a front seating row or front seat of the vehicle. The seat assembly 10 may include a seat back 20 and a seat bottom 22.

The seat back 20 may be configured to support the back of a seat occupant. The seat back 20 may be disposed proximate the seat bottom 22. For example, the seat back 20 may be disposed above the seat bottom 22 and may be pivotally connected to the seat bottom 22. In at least one configuration, the seat back 20 may be pivotable or rotatable about at least one axis with respect to the seat bottom 22. For instance, the seat back 20 may be pivotable or rotatable about a seat back pivot axis 30 with respect to the seat bottom 22. The seat back pivot axis 30 may not be stationary and may move with the seat assembly 10 as will be discussed in more detail below.

The seat bottom 22 may be disposed adjacent to the seat back 20. Like the seat back 20, the seat bottom 22 may also be configured to support a seat occupant. The seat bottom 22 may be disposed on a support member 32, such as a vehicle body structure like a floor pan of a vehicle.

One or more trim covers 40 may form an exterior surface of at least a portion of the seat back 20 and the seat bottom 22. The trim cover 40 may be disposed on one or more cushions 42. For example, one trim cover 40 may engage and may at least partially cover or conceal the cushion 42 of the seat back 20 and another trim cover 40 may engage and may at least partially cover or conceal the cushion 42 of the seat bottom 22. The trim cover 40 may face toward and may contact a seat occupant. The trim cover 40 may be made of any suitable material, such as fabric, vinyl, leather, or combinations thereof. The trim cover 40 may be secured to the seat back 20 and seat bottom 22 in any suitable manner. For example, the trim cover 40 may be secured with one or more attachment features, such as a hook, clip, ring, hook and loop fastener, drawstring or the like.

One or more cushions 42 may be configured to help support a seat occupant. A cushion 42 may be disposed on a support structure or frame of the seat assembly 10 and may be made of any suitable material or materials, such as a molded polymeric material such as open cell foam or closed cell foam.

Figure 2:
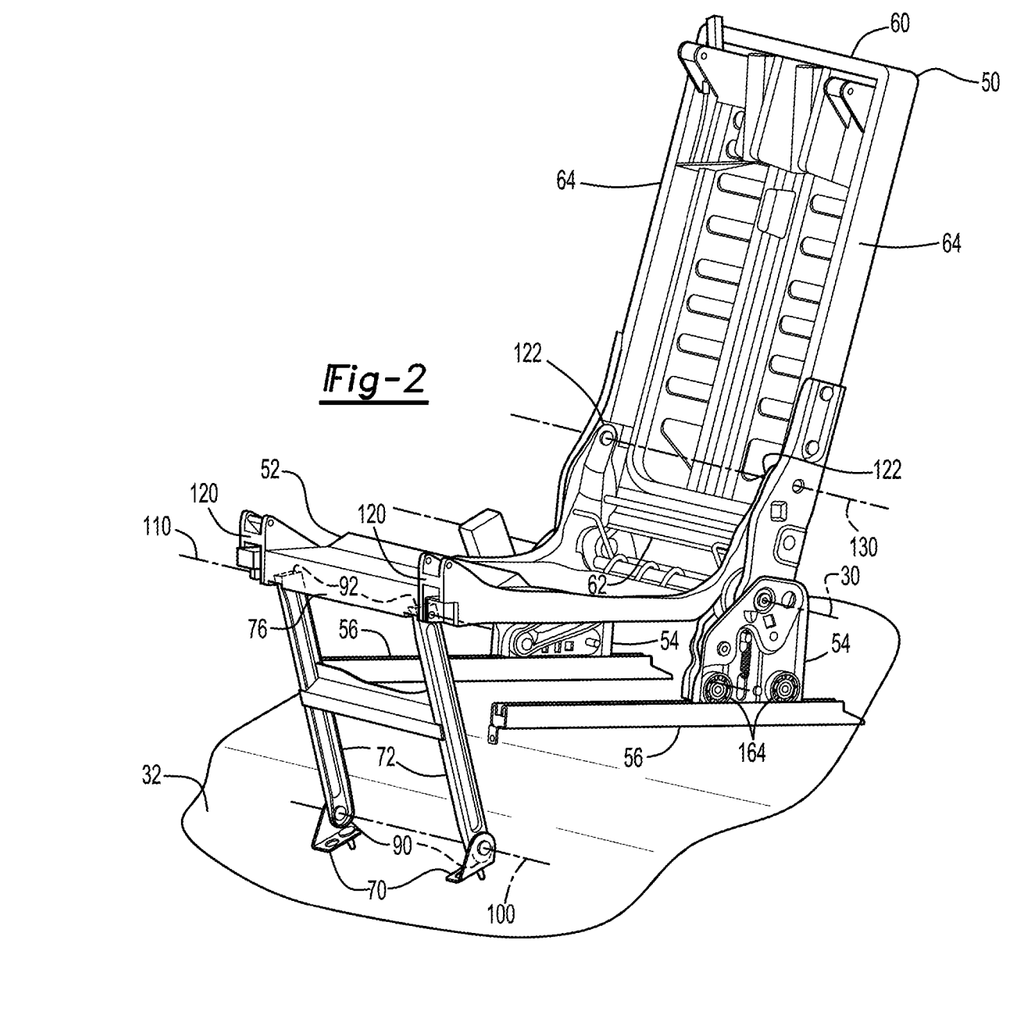
FIG. 2 is a perspective view of the seat assembly with the trim covers and cushions removed.

Referring to FIG. 2, the seat assembly 10 is shown without the trim covers 40 and cushions 42 to more clearly illustrate internal components of the seat assembly 10, such as a seat back frame 50, a seat bottom frame 52, a pair of rear mounting units 54, and a pair of seat tracks 56.

The seat back frame 50 may be a support structure for the seat back 20. In at least one configuration, the seat back frame 50 may include an upper cross member 60, a lower cross member 62, and a pair of lateral side members 64.

The upper cross member 60 may be disposed proximate the top of the seat back 20. The upper cross member 60 may extend between and may be fixedly coupled to the lateral side members 64.

The lower cross member 62 may be disposed proximate the bottom of the seat back 20. The lower cross member 62 may extend between and may be fixedly coupled to the lateral side members 64. In addition, the lower cross member 62 may be disposed substantially parallel to the upper cross member 60 or a portion thereof in one or more configurations.

The lateral side members 64 may be disposed along the lateral sides or left and right sides of the seat back 20. The lateral side members 64 may be spaced apart from each other and may be disposed substantially parallel to each other in one or more configurations.

The seat bottom frame 52 may be mountable on or mounted to the support member 32. At least a portion of the seat bottom frame 52 may be movable with respect to the support member 32 when the seat assembly 10 is moved between first, second, and third positions as will be discussed in more detail below.

Figure 3:
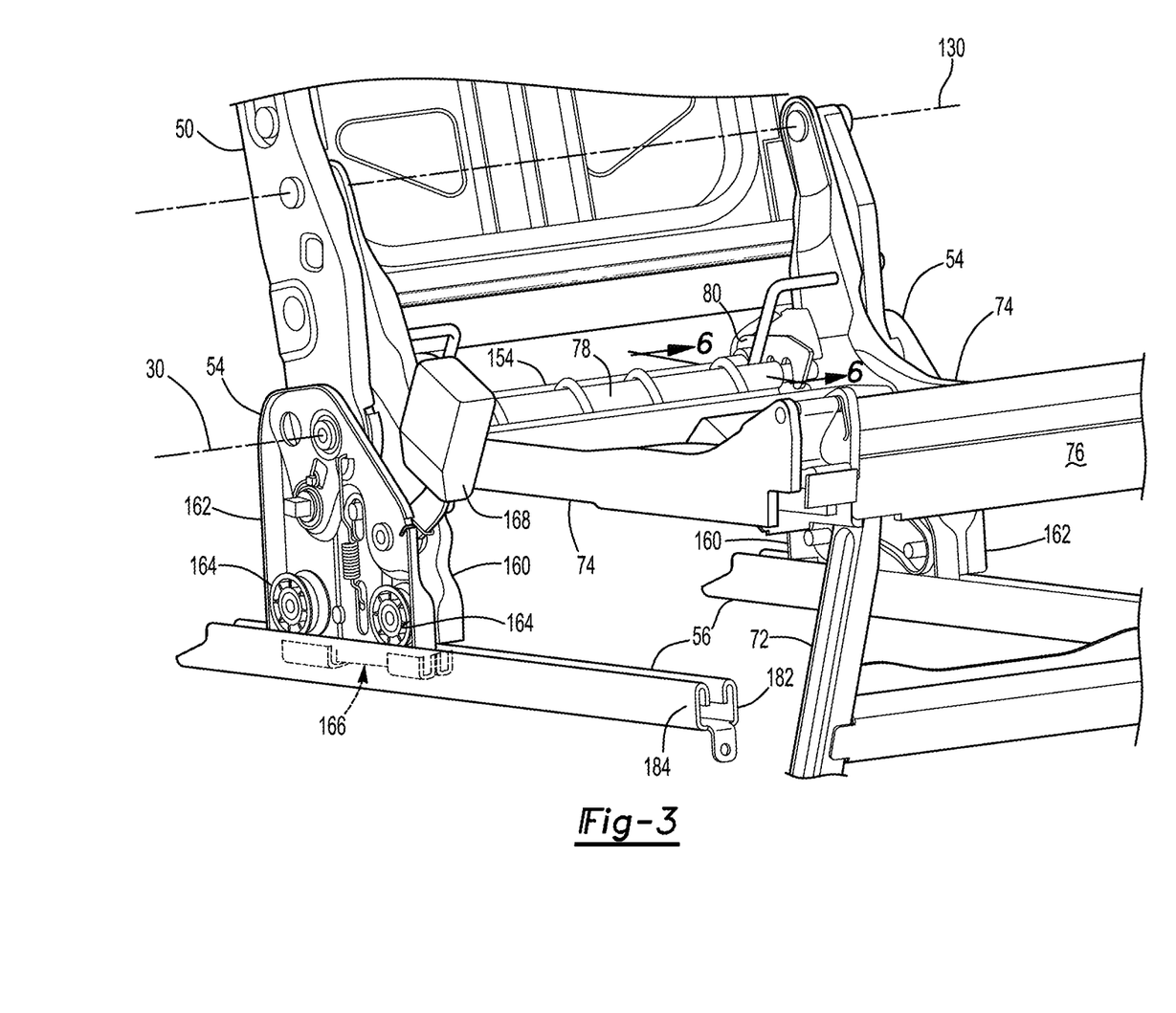
FIG. 3 is a perspective view of a portion of the seat assembly of FIG. 2 that includes a rear mounting unit.

Referring to FIGS. 2 and 3, the seat bottom frame 52 may be a support structure of the seat bottom 22. In at least one configuration, the seat bottom frame 52 may include at least one front mounting bracket 70, at least one front link 72, at least one side link 74, a front member 76, at least one rear member 78, and a latch mechanism 80.

Referring to FIG. 2, at least one front mounting bracket 70 may be fixedly positioned with respect to the support member 32 or may be fixedly mounted to the support member 32. In the configuration shown, two front mounting brackets 70 are provided. The front mounting brackets 70 may be disposed at or near the front of the seat assembly 10 and may be spaced apart from each other. The front mounting brackets 70 may be directly or indirectly mounted on the support member 32 and may be mounted in any suitable manner, such as with one or more fasteners like bolts. The front mounting bracket 70 may be positioned below the seat tracks 56 and below the rear mounting units 54.

Referring to FIG. 2, at least one front link 72 may be pivotally coupled to a corresponding front mounting bracket 70. In the configuration shown, two front links 72 are provided. The front links 72 may be disposed at or near the front of the seat bottom 22 and may be spaced apart from each other. Each front link 72 may have a first front link end 90 and a second front link end 92.

The first front link end 90 may be pivotally or rotatably connected to the support member 32 via a front mounting bracket 70. For example, each front link 72 may be pivotable about a first front link axis 100 with respect to a front mounting bracket 70 and the support member 32. The first front link axis 100 may be disposed substantially parallel to the seat back pivot axis 30. The first front link axis 100 may extend through the first front link end 90. The first front link end 90 may be pivotally coupled to the front mounting bracket 70 in any suitable manner, such as with a pivot pin.

The second front link end 92 may be disposed opposite the first front link end 90. The second front link end 92 may be pivotally or rotatably connected to another portion of the seat bottom frame 52, such as a side link 74 or the front member 76. For example, each front link 72 may be pivotable about a second front link axis 110 with respect to a side link 74 or a front member 76. The second front link axis 110 may be disposed substantially parallel to the seat back pivot axis 30. In addition, the second front link axis 110 may extend through the second front link end 92. The second front link end 92 may be pivotally coupled to a side link 74 or the front member 76 in any suitable manner, such as with a pivot pin.

At least one side link 74 may be pivotally or rotatably coupled to the seat back frame 50. In the configuration shown, two side links 74 are provided. The side links 74 may extend along opposing lateral sides of the seat bottom frame 52 and may extend in a forward/backward direction or between the front and back of the seat bottom 22. The side links 74 may be disposed substantially parallel to each other and may be spaced apart from each other. In at least one configuration, each side link 74 may have a hockey stick or L-shaped configuration and may include a first side member end 120, a second side member end 122.

The first side member end 120 may be disposed proximate the front of the seat bottom frame 52. In at least one configuration, the first side member end 120 may be pivotally or rotatably coupled to a second front link end 92 of a corresponding front link 72. For example, each side link 74 may receive a corresponding front link 72 and may be pivotable about the second front link axis 110 with respect to the front link 72. The second front link axis 110 may extend through the first side member end 120.

The second side member end 122 may be disposed opposite the first side member end 120. The second side member end 122 may be pivotally or rotatably connected to the seat back frame 50. For example, each side link 74 may be pivotable about a side link axis 130 with respect to the seat back frame 50. As such, the seat back 20 and seat bottom 22 may be pivotally mounted to each other along the side link axis 130. The side link axis 130 may be positioned above the seat back pivot axis 30.

The front member 76 may be disposed proximate the front of the seat bottom frame 52. The front member 76 may extend laterally across the front of the seat bottom frame 52 and may be fixedly coupled to the side links 74. For example, the front member 76 may extend from the first side member end 120 of one side link 74 to the first side member end 120 of another side link 74. The front member 76 or a portion thereof may be disposed above the second front link axis 110 when the seat assembly 10 is in the first position.

Referring to FIG. 3, at least one rear member 78 may be disposed opposite the front member 76. The rear member 78 may be disposed proximate the rear of the seat bottom frame 52 and may be generally positioned underneath the seat back frame 50. The rear member 78 may extend laterally across the rear of the seat bottom frame 52 and may be fixedly coupled to the side links 74 of a seat bottom frame 52.

Figure 6:
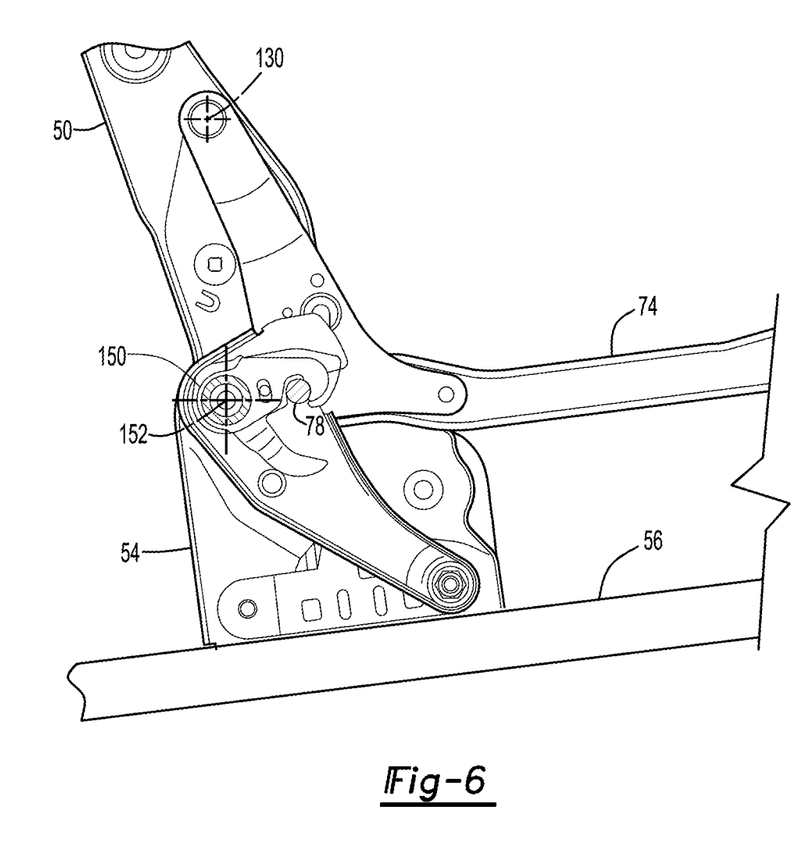
FIG. 6 is a section view of the seat assembly along section line 6-6 in FIG. 3.

Referring to FIGS. 3 and 6, the latch mechanism 80 may selectively couple or selectively secure the seat back frame 50 to the seat bottom frame 52. As such, the latch mechanism 80 may selectively inhibit or prevent movement of the seat bottom 22 with respect to the seat back 20. The latch mechanism 80 may move between a latched position and an unlatched position. In the latched position, the latch mechanism 80 may couple the rear member 78 to the rear mounting units 54 such that the seat back frame 50 may not pivot or rotate about the side link axis 130 with respect to the seat bottom frame 52. In the unlatched position, the latch mechanism 80 may not couple the rear member 78 to the rear mounting units 54 and the seat back frame 50 may be free to pivot or rotate about the side link axis 130 with respect to the side links 74 of the seat bottom frame 52. The latch mechanism 80 may have any suitable configuration. For instance, the latch mechanism 80 may include one or more locking pawls 150 that may be rotatably coupled to the rear mounting unit 54 such that a locking pawl 150 may be rotatable about a locking pawl axis 152. In at least one configuration, the locking pawl 150 may be rotatable about a connecting tube 154 that may extend along the locking pawl axis 152. The connecting tube 154 may extend from one rear mounting unit 54 to the other rear mounting unit 54 to help align and interconnect the rear mounting units 54 so they may slide together along their respective seat tracks 56. As such, the connecting tube 154 may help synchronize movement of the rear mounting units 54 along the seat tracks 56. A locking pawl 150 may include a hook that may hook or latch onto a rear member 78 of the seat bottom frame 52 to inhibit or prevent the seat back 20 from pivoting or rotating with respect to the seat bottom 22. For instance, the locking pawl 150 may inhibit or prevent the seat back frame 50 from pivoting or rotating with about the side link axis 130 with respect to the side links 74 of the seat bottom frame 52. The seat back frame 50 may be free to rotate about the side link axis 130 with respect to the side links 74 when the locking pawl 150 and its hook is not latched onto the rear member 78.

The locking pawl 150 may be actuated in any suitable manner. For instance, an actuator may be operatively connected to the locking pawl 150 and may be configured to actuate the locking pawl 150 from a hooked to an unhooked position. The actuator may have any suitable configuration. For instance, the actuator may be a mechanical actuator, electromechanical actuator, electrical actuator, or the like. A biasing member, such as a spring, may be provided to bias the locking pawl 150 from the unhooked position toward the hooked position. As such, the actuator may actuate the locking pawl 150 from the hooked position to the unhooked position when sufficient force is provided to overcome the biasing force of the biasing member and the biasing member may actuate the locking pawl 150 from the unhooked position to the hooked position when sufficient force is not provided by the actuator.

Referring to FIGS. 2 and 3, a rear mounting unit 54 may be moveably disposed on or slidable along a corresponding seat track 56. In addition, a rear mounting unit 54 may be selectively couplable to a corresponding seat track 56. In the configuration shown, two rear mounting units 54 are provided. The rear mounting units 54 may be disposed at or near the rear of the seat assembly 10 and may be spaced apart from each other. The rear mounting units 54 may be directly or indirectly mounted on a seat track 56. The seat back frame 50, and hence the seat back 20, may be mounted to the rear mounting unit 54. For instance, the seat back frame 50 may be pivotally or rotatably connected to the rear mounting units 54 and may be pivotable or rotatable about the seat back pivot axis 30 with respect to the rear mounting units 54. The seat back frame 50 may be pivotally connected to a rear mounting unit 54 in any suitable manner. For example, a pivot pin or rotary coupling may pivotally couple the seat back frame 50 to a rear mounting unit 54. As such, the seat back pivot axis 30 may extend through the rear mounting units 54. The seat bottom frame 52 may be spaced apart from and may not be mounted to the rear mounting unit 54. In at least one configuration, a rear mounting unit 54 may include a first bracket 160, a second bracket 162, one or more rollers 164, and a rear mounting unit latch mechanism 166.

Referring to FIG. 3, the first bracket 160 may be partially received in the seat track 56 and may extend upward above the seat track 56. The seat back frame 50 may be pivotally coupled to the first bracket 160. The first bracket 160 may extend generally upward from the seat track 56 and may be disposed on an inboard side of the rear mounting unit 54 such that the first bracket 160 may be located between the seat back frame 50 and a side link 74 of the seat bottom frame 52. Moreover, a portion of the seat back 20, such as a lateral side member 64 of the seat back frame 50, may be positioned between or received between the first bracket 160 and the second bracket 162.

Referring to FIG. 3, the second bracket 162 may be fixedly coupled to the first bracket 160. In addition, the second bracket 162 may be disposed opposite the first bracket 160. The second bracket 162 may be configured as a mirror image of the first bracket 160 in one or more embodiments. As such, the second bracket 162 may be disposed on an outboard side of the rear mounting unit 54 such that the seat back frame 50 is disposed between the first bracket 160 and the second bracket 162. The second bracket 162 may be partially received in the seat track 56 and may extend upward above the seat track 56. The seat back frame 50 may be pivotally coupled to the second bracket 162. A seat belt latch 168 may be mounted to the first bracket 160 and/or the second bracket 162 and may be positioned between the first bracket 160 and the second bracket 162 of a rear mounting unit 54. It is noted that the second bracket 162 is omitted in FIG. 4 to better illustrate other components of the rear mounting unit 54.

One or more rollers 164 may be mounted to or coupled to the first bracket 160, the second bracket 162, or both. In the configuration shown in FIG. 3, two rollers 164 are provided that extend from the second bracket 162 and are disposed opposite the first bracket 160 such that the second bracket 162 is positioned between the first bracket 160 and the rollers 164; however it is contemplated that the positioning of the rollers 164 may be reversed or that rollers be provided adjacent to the first bracket 160 and the second bracket 162. The rollers 164 may engage the seat track 56 and may rotate such that the rollers 164 may roll along a top side of the seat track 56 that may face away from the support member 32 upon which the seat assembly 10 may be disposed.

Figure 4:
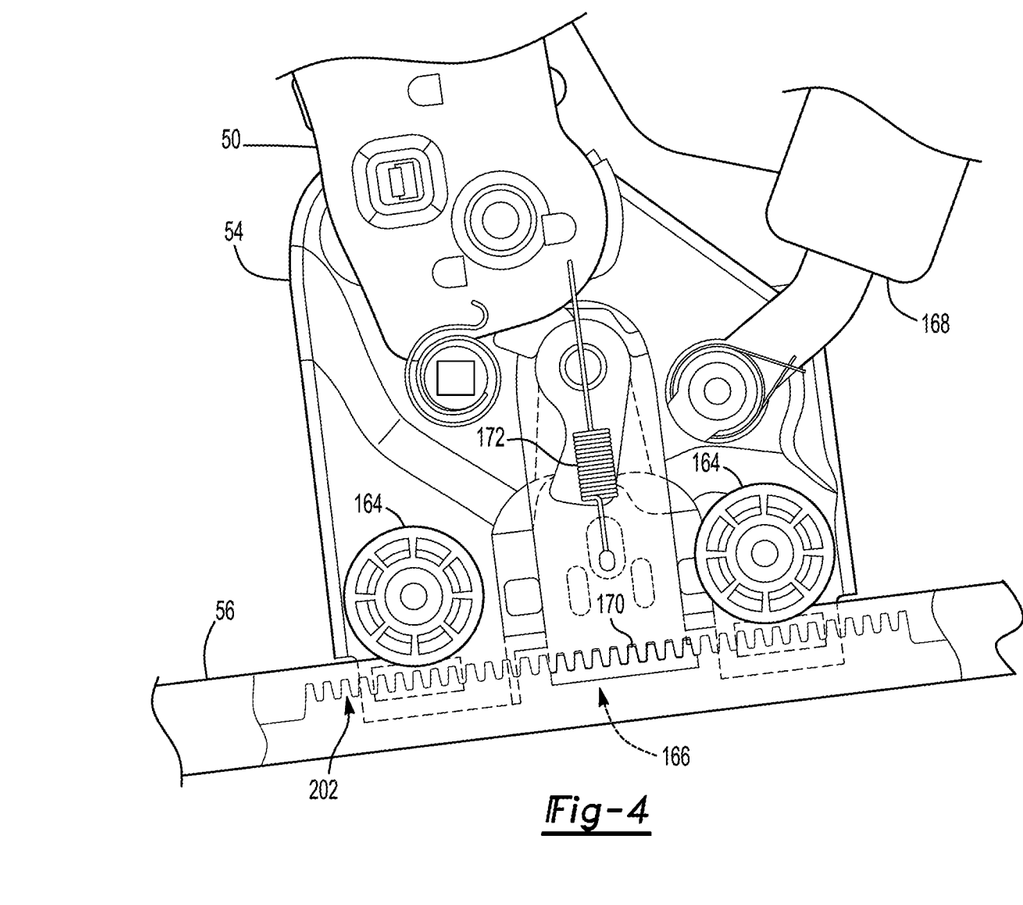
FIG. 4 is a side view of a portion of the seat assembly shown in FIG. 3 in which the rear mounting unit is illustrated without a second bracket.

Referring to FIGS. 3 and 4, the rear mounting unit latch mechanism 166 may selectively couple the rear mounting unit 54 to the seat track 56. The rear mounting unit latch mechanism 166 may be provided with one or both of the rear mounting units 54 and may have any suitable configuration. For example, the rear mounting unit latch mechanism 166 may be configured as a latch that may include one or more teeth 170 that may selectively engage the seat track 56. In at least one configuration, a plurality of teeth 170 may be provided that may extend in a generally horizontal direction and may be spaced apart from each other. The teeth 170 may face upward and may be positioned inside the seat track 56. Each tooth 170 may be receivable in a corresponding notch in the seat track 56 when the rear mounting unit latch mechanism 166 is in a locked position, thereby inhibiting or preventing movement of the rear mounting unit 54 with respect to the seat track 56. The teeth 170 may be actuated to an unlocked position to permit movement of the rear mounting unit 54 with respect to the seat track 56. For example, the teeth 170 may be actuated downward toward the support member 32 and the bottom wall of the seat track 56 to disengage the teeth 170 from the seat track 56, thereby permitting the rollers 164 to roll along the seat track 56 and move the rear mounting unit 54 in a forward or backward direction along the seat track 56. As is best shown in FIG. 4, the rear mounting unit latch mechanism 166 and/or teeth 170 may be axially positioned between the front and back rollers 164. In addition, the rear mounting unit latch mechanism 166 may be at least partially received in the seat track 56.

The rear mounting unit latch mechanism 166 and its teeth 170 may be actuated in any suitable manner. For instance, an actuator may be operatively connected to the rear mounting unit latch mechanism 166 and may be configured to actuate the teeth 170 from the locked position to the unlocked position. The actuator may have any suitable configuration. For instance, the actuator may be a mechanical actuator, electromechanical actuator, electrical actuator, or the like. As a nonlimiting example, the actuator may be a release handle that may be mounted to the seat assembly 10 and may be operatively connected to the teeth 170 with one or more linkages, such as a cable, rod, or the like. The rear mounting unit latch mechanism 166 may also include a biasing member 172, such as a spring, that may bias the teeth 170 from the unlocked position toward the locked position or upward from the perspective shown in FIGS. 3 and 4. The biasing member 172 may be coupled to the rear mounting unit latch mechanism 166 at a first end and may be coupled to a bracket like the first bracket 160 or the second bracket 162 at an opposing second end depending on where the biasing member 172 is located. In the configuration shown in FIG. 3, the second end is configured as a hook that hooks onto the second bracket 162 above the rear mounting unit latch mechanism 166. As such, the actuator may actuate the teeth 170 from the locked position to the unlocked position when sufficient force is provided to overcome the biasing force of the biasing member 172 and the biasing member 172 may actuate the teeth 170 from the unlocked position toward or to the locked position when sufficient force is not provided by the actuator.

Figure 5:
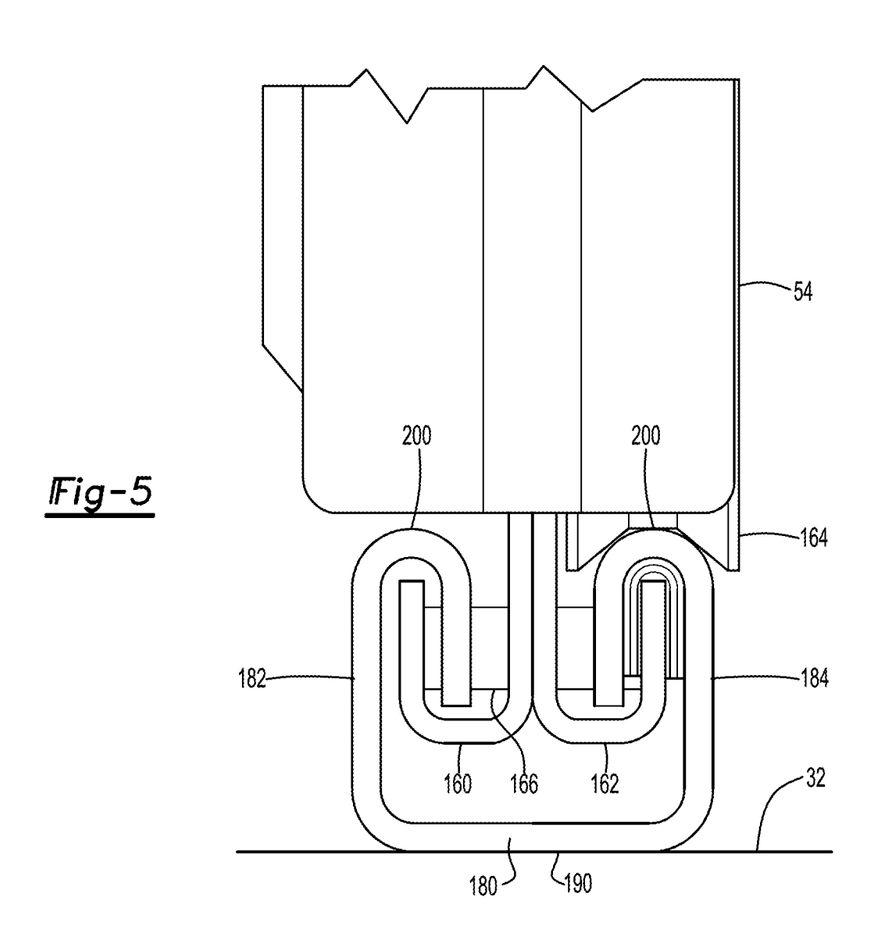
FIG. 5 is an end view of FIG. 4.

Referring to FIGS. 3-5, an example of a seat track 56 is shown. The seat track 56 may permit longitudinal movement of the seat assembly 10 (i.e., movement in a forward/backward direction) with respect to the support member 32. In the configuration shown, two seat tracks 56 are provided that are spaced apart from each other and that extend substantially parallel to each other in a longitudinal direction.

The seat track 56 may be configured to be disposed on and fixedly mounted to the support member 32. For example, the seat track 56 may be coupled to the support member 32 with one or more fasteners such as bolts, pins, or the like. In at least one configuration and as is best shown in FIG. 5, the seat track 56 may include a bottom wall 180, a first side wall 182, and a second side wall 184. In addition, the seat track 56 may extend in a forward/backward or fore/aft direction along a seat track axis 186.

The bottom wall 180 may be disposed proximate and may engage the support member 32. As such, the bottom wall 180 may be disposed below the rear mounting unit 54 and may be disposed at the bottom of the seat track 56. The bottom wall 180 may have a bottom side 190 that may face toward and may be mountable to the support member 32. In at least one configuration, the bottom wall 180 may be substantially planar and may extend from the first side wall 182 to the second side wall 184.

The first side wall 182 may extend from a first lateral end of the bottom wall 180. The first side wall 182 may extend in a generally upward direction and may have a distal end that may hook over hook-shaped bottom ends of the first bracket 160. As is best shown in FIG. 4, the first side wall 182 may have a top side 200 and a plurality of notches 202. The top side 200 may be disposed opposite the bottom side 190 and may face away from the bottom side 190. One or more rollers 164 may engage and roll along the top side 200 of the first side wall 182 if a roller 164 is positioned above the top side 200. The plurality of notches 202 may be disposed proximate or may extend from the distal end of the first side wall 182. A notch 202 may be configured to receive a portion of a tooth 170 of the rear mounting unit latch mechanism 166 to inhibit movement of the rear mounting unit latch mechanism 166 with respect to the seat track 56.

Referring to FIG. 5, the second side wall 184 may extend from a second lateral end of the bottom wall 180. As such, the second side wall 184 may be disposed opposite the first side wall 182. In addition, the second side wall 184 may have mirror symmetry with the first side wall 182. As such, the second side wall 184 may extend in a generally upward direction and may have a distal end that may hook over hook-shaped ends of the second bracket 162. Like the first side wall 182, the second side wall 184 may have a top side 200 and a plurality of notches 202. The top side 200 may be disposed opposite the bottom side 190 and may face away from the bottom side 190. One or more rollers 164 may engage and roll along the top side 200 of the second side wall 184 if a roller 164 is positioned above the top side 200, such as is shown in FIG. 5. As such, a portion of the second side wall 184 that includes the top side 200 may be positioned between the roller 164 and the hook portion of the second bracket 162 that extends into the seat track 56 and underneath the top side 200. The portion of the second bracket 162 that extends upward out of the seat track 56 and to which the roller 164 is mounted may be positioned between the first bracket 160 and the roller 164. The plurality of notches 202 may also be disposed proximate or may extend from the distal end of the second side wall 184 and may be configured to receive a portion of a tooth of the rear mounting unit latch mechanism 166. The notches 202 of the first side wall 182 and the notches 202 of the second side wall 184 may be aligned.

The rollers 164 of the rear mounting unit latch mechanism 166 may be disposed on and may contact the seat track 56. In FIG. 5, the rollers 164 are disposed on the top side of the second side wall 184; however, it is contemplated that one or more rollers 164 may be disposed on the top side of the first side wall 182 or on both the first side wall 182 and the second side wall 184.

Figure 7:
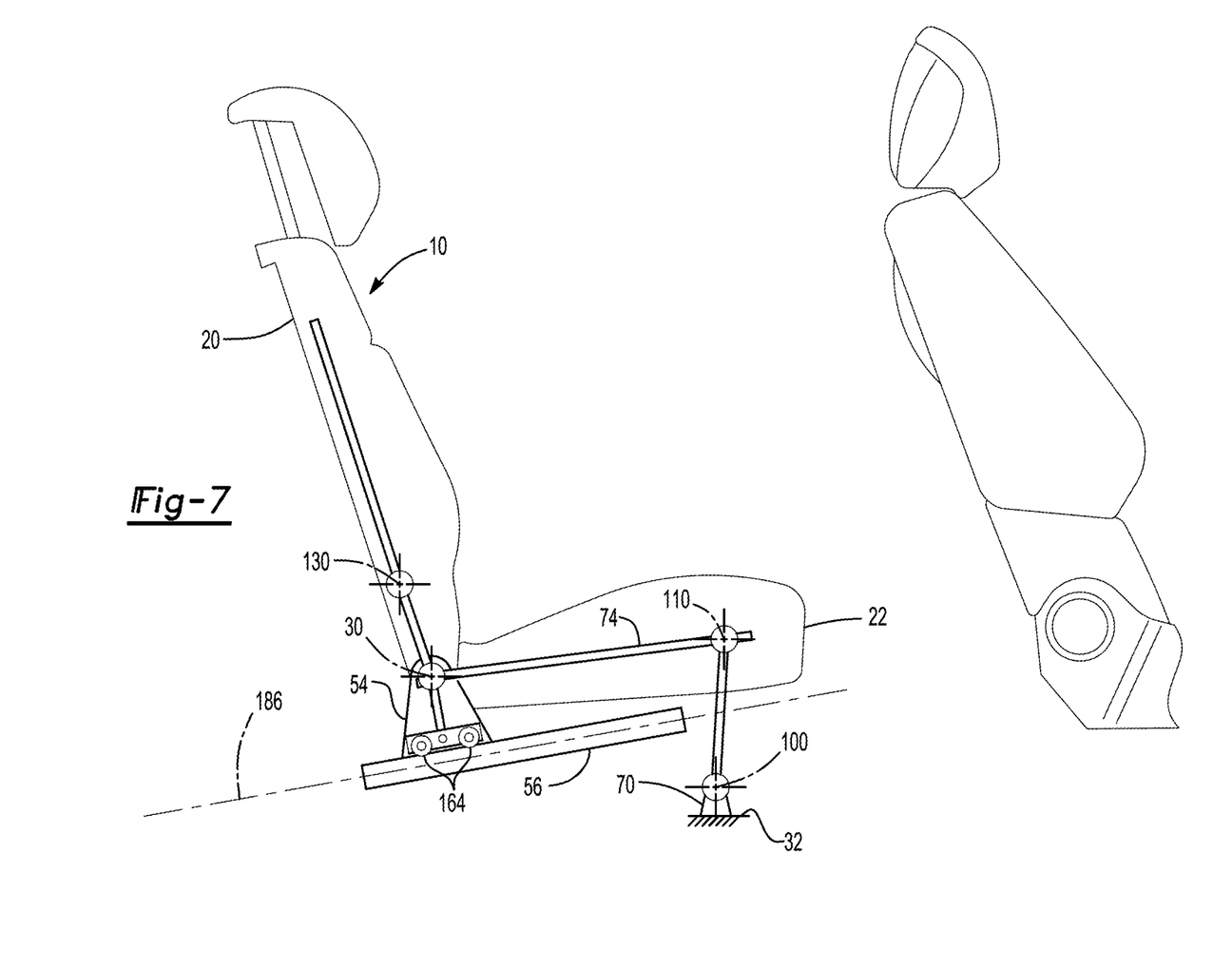
FIG. 7 is a side view of the seat assembly in a first position.
Figure 8:
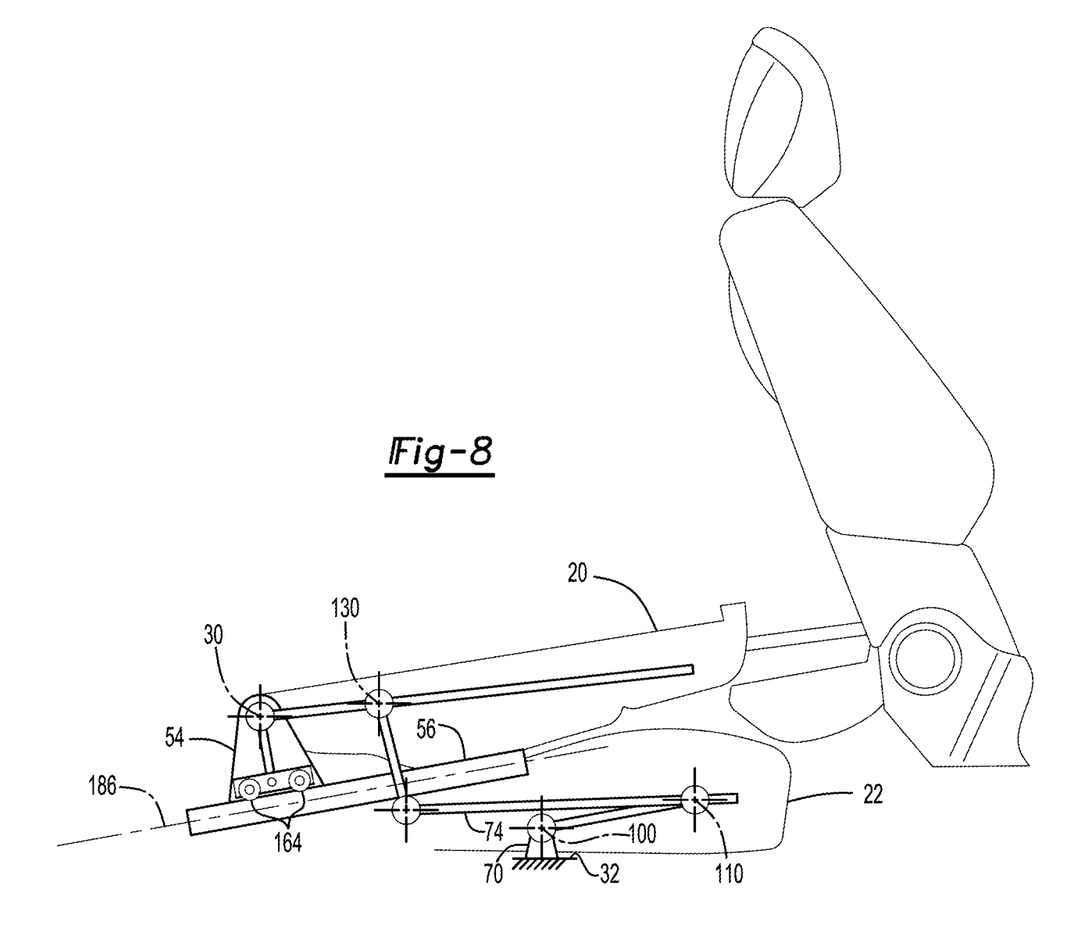
FIG. 8 is a side view of the seat assembly in a second position.
Figure 9:
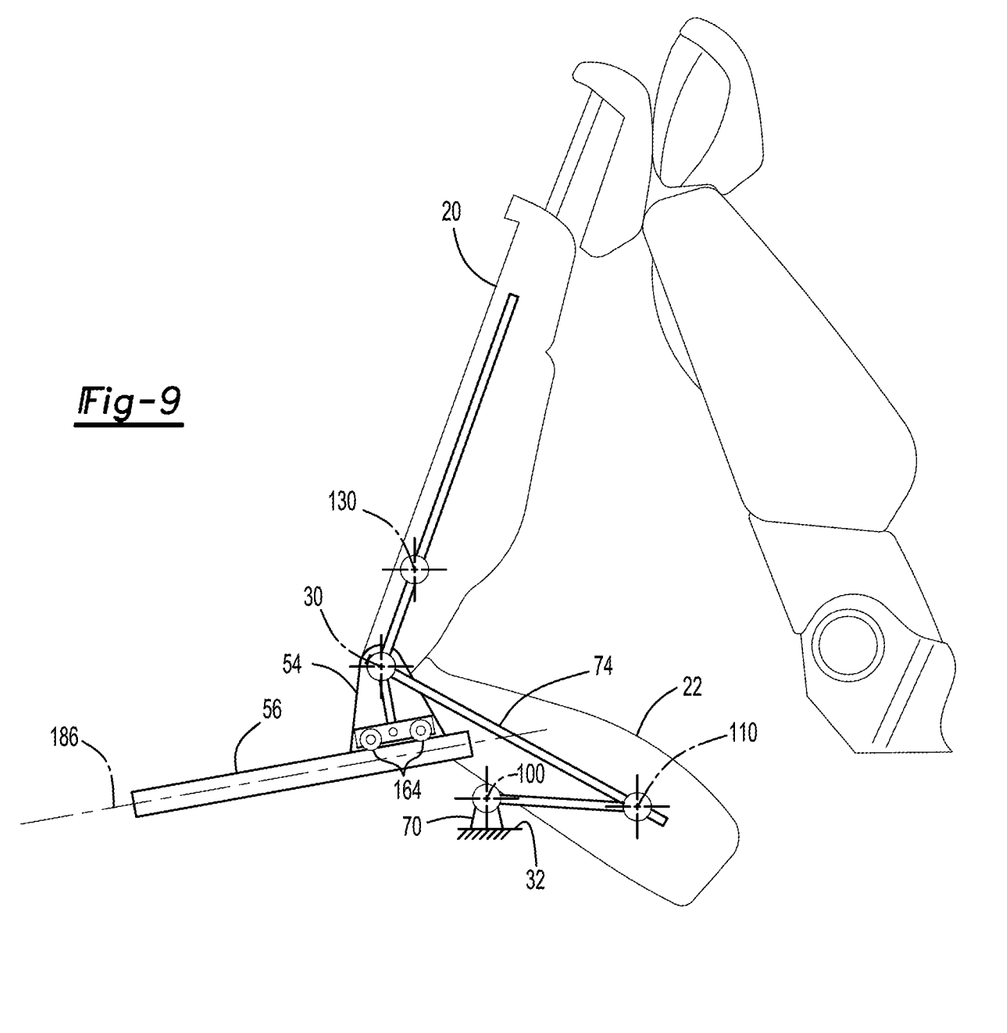
FIG. 9 is a side view of the seat assembly in a third position.

Referring to FIGS. 7, 8 and 9, the seat assembly 10 is shown inside a vehicle in various positions. More specifically, the seat assembly 10 may be configured to move or pivot between a first position, a second position, and a third position. These figures are depicted from the side of the vehicle and show the seat assembly 10 positioned behind a front seat, which is positioned to the right of the seat assembly 10 from the perspective shown. For clarity, these figures do not show portions of the vehicle body, such as the door, roof, side pillars, or the entirety of the floor pan upon which the seat assembly 10 and the front seat are disposed.

In FIG. 7, the seat assembly 10 is shown in the first position, which may also be referred to as a seating position or a nominal position. The seat back 20 may be positioned in a generally upright or generally vertical position to receive a seat occupant when in the first position. For instance, the seat back 20 may be reclined with respect to vertical by any suitable predetermined amount, such as between 10-20° when in the first position. The seat bottom 22 may be positioned in a generally horizontal position in the first position. For instance, the seat bottom 22 may be angled upward with respect to horizontal by any suitable predetermined amount, such as between 5-15° when in the first position. As such, the included angle between the seat back 20 and the seat bottom 22 may be greater than 90° in the first position. The rear mounting unit latch mechanism 166 (which is best shown in FIG. 4) may be in the locked position and locked to the seat track 56, thereby inhibiting or preventing rolling of the rear mounting unit 54 along the seat track 56 in the first position. The latch mechanism 80 (which is best shown in FIG. 6) may be latched or in the latched position to hold the seat assembly 10 in the first position and inhibit rotation of the seat back 20 about the seat back pivot axis 30 and inhibit rotation of the seat back 20 with respect to the seat bottom 22 about the side link axis 130. The seat back pivot axis 30 may be disposed further forward than the side link axis 130 when the seat assembly 10 is in the first position. The seat back pivot axis 30 may also be disposed closer to the first front link axis 100 than the side link axis 130 when the seat assembly 10 is in the first position. The first front link axis 100 may be disposed below the second front link axis 110 in the first position.

In FIG. 8, the seat assembly 10 is shown in the second position. The seat back 20 may be folded over the seat bottom 22 by rotating the seat back 20 about the seat back pivot axis 30 in the second position, but the rear mounting units 54 may remain stationary and may not roll along the seat tracks 56 during movement between the first position and the second position. The seat assembly 10 may move from the first position to the second position when the latch mechanism 80 is unlatched, thereby permitting the seat back 20 to pivot or rotate about the seat back pivot axis 30 with respect to the rear mounting units 54, the side links 74 to pivot about the side link axis 130 with respect to the seat back 20, and the front links 72 to pivot about the first front link axis 100 and the second front link axis 110. As compared to the first position, the seat back 20 may be folded forward over the seat bottom 22 to a generally horizontal position and may contact the top of the seat bottom 22 while the seat bottom 22 may pivot forward and downward toward the support member 32. The front links 72 may pivot forward about the first front link axis 100 and under the seat bottom 22. The rear mounting unit latch mechanism 166 may remain locked to inhibit movement of the rear mounting units 54. As such, the rear mounting units 54 and the seat back pivot axis 30 may remain stationary or remain in the same position in the second position as compared to the first position. The side link axis 130 may be disposed further forward than the seat back pivot axis 30 when the seat assembly 10 is in the second position. The side link axis 130 may also be disposed closer to the first front link axis 100 than the seat back pivot axis 30 when the seat assembly 10 is in the second position. The first front link axis 100 may be disposed below the second front link axis 110 in the second position.

In FIG. 9, the seat assembly 10 is shown in the third position. The third position may also be referred to as an easy entry position in which the seat back 20 and seat bottom 22 may move further forward to increase the amount of space behind the seat back 20 to facilitate access or entry into the vehicle or exit from the vehicle with respect to the region behind the seat assembly 10. The seat assembly 10 may move from the first position to the third position when the rear mounting unit latch mechanism 166 is unlocked and the latch mechanism 80 is latched. Unlocking the rear mounting unit latch mechanism 166 permits the rear mounting units 54 to roll along the seat tracks 56, which allows the seat back pivot axis 30 to move forward, causes the seat bottom 22 and seat back 20 to pivot together about the seat back pivot axis 30, and causes the front links 72 to pivot about the first front link axis 100 and the second front link axis 110 to lower the front end of the seat bottom 22. The latch mechanism 80 inhibits or prevents rotation of the side link 74 about the side link axis 130, thereby inhibiting or preventing rotation of the seat back 20 with respect to the seat bottom 22 about the side link axis 130, thereby maintaining the angular position of the seat back 20 relative to the seat bottom 22. However, the seat back 20 and seat bottom 22 both move forward and rotate in a clockwise direction from the perspective shown when moving from the first position to the third position. The front link 72 may rotate about the first front link axis 100 and the second front link axis 110 and the seat bottom 22 and the seat back 20 may rotate about the seat back pivot axis 30 but not the side link axis 130 when the seat assembly 10 moves between the first position and the third position. As is best shown by comparing FIGS. 8 and 9, the seat bottom 22 may move further forward or to the right from the perspective shown and downward when the seat assembly 10 is in the third position as compared to the second position. The side link axis 130 may be disposed further forward than the seat back pivot axis 30 when the seat assembly 10 is in the third position. The seat back pivot axis 30 may also be disposed closer to the first front link axis 100 than the side link axis 130 when the seat assembly 10 is in the third position. The second front link axis 110 may be disposed below the first front link axis 100 in the third position.

The seat assembly 10 can move back to the first position by effectively reversing the actuation sequences discussed above.

Figure 10:
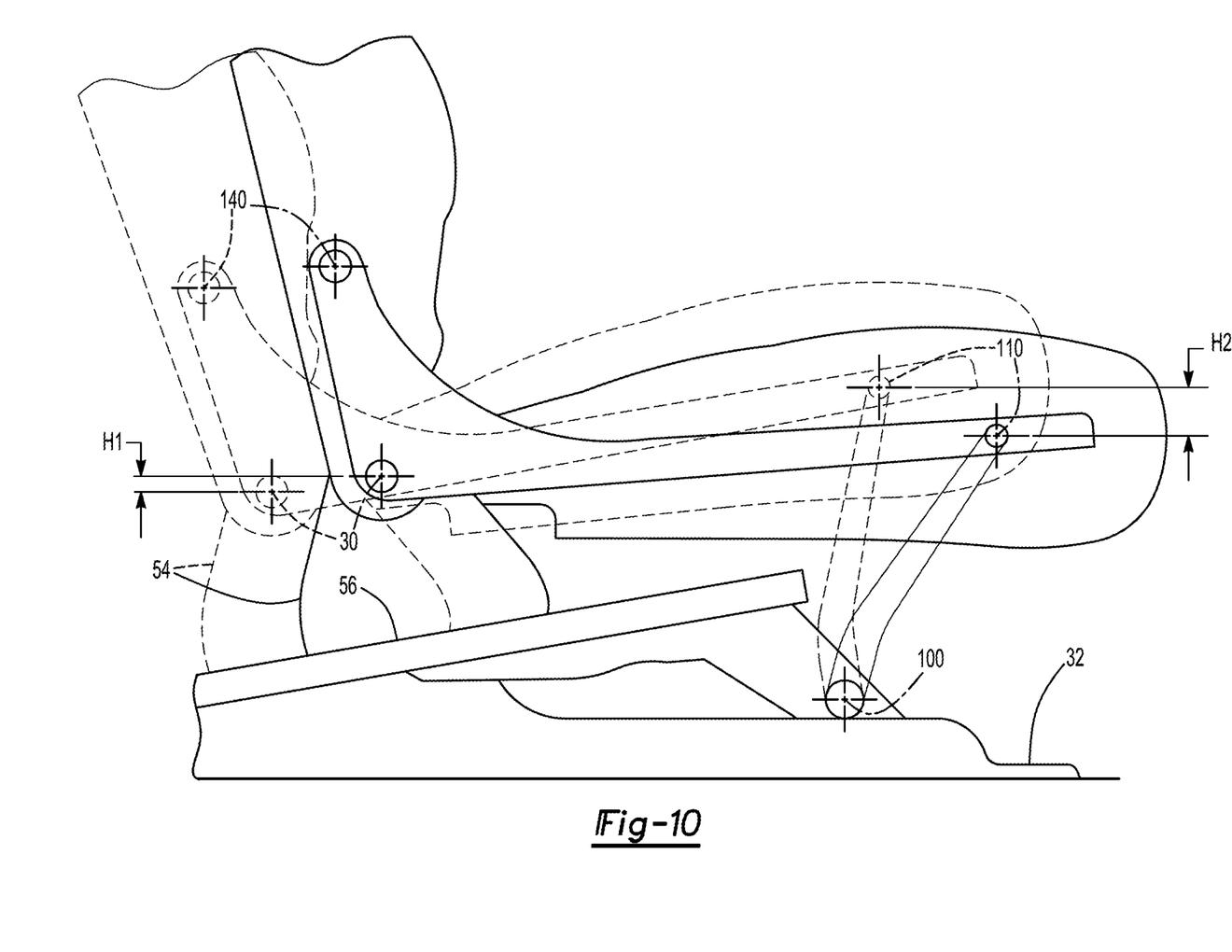
FIG. 10 is a side view showing movement of the seat assembly from the first position toward the third position.

Referring to FIG. 10, the seat assembly is shown in the first position in dashed lines and in an intermediate position in solid lines. The intermediate position is a position between the first position and the third position or a position in which the seat assembly 10 is being moved from the first position toward the third position. The rear end of the seat bottom 22 and the seat back pivot axis 30 move upward by a short distance designated H1 when the seat assembly 10 moves from the first position to the intermediate position. Similarly, the position of the second front link axis 110 moves downward by a short distance designated H2 when the seat assembly 10 moves from the first position to the intermediate position. The magnitudes of H1 and H2 may be identical or substantially similar to each other, thereby facilitating smooth movement of the seat assembly 10.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
a seat track mountable to a support member;
a rear mounting unit that is moveably disposed on the seat track, wherein the rear mounting unit has a rear mounting unit latch mechanism that selectively couples the rear mounting unit to the seat track to inhibit movement of the rear mounting unit with respect to the seat track;

a seat back that is pivotally mounted to the rear mounting unit on a seat back pivot axis;

a seat bottom that is pivotally mounted to the seat back along a side link axis, wherein the seat bottom has a front link that that is pivotable about a first front link axis at a first front link end and is pivotable about a second front link axis at a second front link end, wherein the first front link axis is disposed below the second front link axis when the seat assembly is in a first position and in a second position, the second front link axis is disposed below the first front link axis when the seat assembly is in a third position, the first front link end being pivotally attachable to the support member via a front mounting bracket such that the front link can pivot about the first front link axis and the second front link end being pivotally attached to a frame of the seat bottom such that the front link can pivot about the second front link axis; and a latch mechanism that selectively inhibits movement of the seat bottom with respect to the seat back, wherein the side link axis is disposed closer to the first front link axis than the seat back pivot axis is when the seat assembly is in the second position and the seat back pivot axis is disposed closer to the first front link axis than the side link axis is when the seat assembly is in the first position and the third position.

2. The seat assembly of claim 1 wherein the seat assembly is held in the first position in which the seat back is generally upright and the seat bottom is generally horizontal when (a) the rear mounting unit latch mechanism inhibits movement of the rear mounting unit with respect to the seat track, and (b) the latch mechanism inhibits rotation of the seat back about the seat back pivot axis and inhibits rotation of the seat back with respect to the seat bottom about the side link axis.

3. The seat assembly of claim 2 wherein the seat assembly is moveable from the first position to the second position in which the seat back is folded over the seat bottom by rotating the seat back about the seat back pivot axis when (a) the rear mounting unit latch mechanism inhibits movement of the rear mounting unit with respect to the seat track, and (b) the latch mechanism is unlatched to permit rotation of the seat back about the seat back pivot axis, which thereby permits the seat back and the seat bottom to rotate with respect to each other about the side link axis.

4. The seat assembly of claim 3 wherein the seat bottom moves forward and downward when the seat assembly moves from the first position to the second position.

5. The seat assembly of claim 3 wherein the seat assembly is moveable from the first position to the third position in which the seat back and the seat bottom move forward and rotate about seat back pivot axis while maintaining an angular position of the seat back with respect to the seat bottom when (a) the rear mounting unit latch mechanism permits movement of the rear mounting unit with respect to the seat track, and (b) the latch mechanism inhibits rotation of the seat back with respect to the seat bottom about the side link axis.

6. The seat assembly of claim 5 wherein the seat bottom moves forward and downward a first distance from the first position when the seat assembly moves from the first position to the third position and the seat bottom moves forward and downward a second distance from the first position when the seat assembly moves from the first position to the second position, wherein the first distance is greater than the second distance.

7. The seat assembly of claim 6 wherein the seat back pivot axis is disposed further forward than the side link axis when the seat assembly is in the first position, and the side link axis is disposed further forward than the seat back pivot axis when the seat assembly is in the second position and the third position.

8. The seat assembly of claim 1 wherein the rear mounting unit includes a bracket and a roller that is rotatably mounted to the bracket and that rolls along a top side of the seat track such that the roller is disposed outside of the seat track and above a portion of the bracket that is received inside the seat track.

9. The seat assembly of claim 1 wherein the rear mounting unit includes two brackets that are fixedly coupled to each other and that contact each other, wherein the seat back is received between the two brackets.

10. The seat assembly of claim 1 wherein the front link rotates about the first front link axis and the second front link axis and the seat bottom and the seat back rotate about the seat back pivot axis but not the side link axis when the seat assembly moves between the first position and the third position.

11. A seat assembly comprising:

a seat track that has a bottom side that is adapted to be mounted to a support member and a top side disposed opposite the bottom side;

a rear mounting unit that is moveably disposed on the seat track, wherein the rear mounting unit has a second bracket that is partially received in the seat track, a roller that rolls along the top side of the seat track such that the roller is disposed outside of the seat track and is positioned directly above a distal end of the second bracket that is received inside the seat track, and a rear mounting unit latch mechanism that is received in the seat track and that selectively couples the rear mounting unit to the seat track to inhibit rolling of the rear mounting unit along the top side;

a seat back that is pivotally mounted to the rear mounting unit;

a seat bottom that is pivotally mounted to the seat back; and a latch mechanism that selectively inhibits movement of the seat bottom with respect to the seat back;

wherein the rear mounting unit includes a first bracket, the second bracket is fixedly coupled to the first bracket, and the seat back is received between the first bracket and the second bracket.

12. The seat assembly of claim 11, wherein the seat bottom has a front link, a first front link end of the front link being pivotally connected to the support member via a front mounting bracket such that the front link is pivotable about a first front link axis at the first front link end, and a second front link end of the front link being pivotally connected to a frame of the seat bottom such that the front link is pivotable about a second front link axis at the second front link end.

13. The seat assembly of claim 11 wherein the rear mounting unit includes a first bracket, the second bracket is fixedly coupled to the first bracket, and the seat back is received between the first bracket and the second bracket.

14. The seat assembly of claim 13 wherein the first bracket and the second bracket are partially received in the seat track.

15. The seat assembly of claim 13 wherein the seat track is positioned between the roller and the second bracket.

16. The seat assembly of claim 13 wherein the roller is mounted to the second bracket such that the second bracket is positioned between the first bracket and the roller.

17. The seat assembly of claim 13 wherein a second roller is mounted to the second bracket and is configured to roll along the top side of the seat track, wherein the seat track extends along a seat track axis and the rear mounting unit latch mechanism is axially positioned between the roller and the second roller.

18. The seat assembly of claim 17 wherein the rear mounting unit latch mechanism is at least partially received in the seat track.

19. The seat assembly of claim 18 further comprising a biasing member that biases the rear mounting unit latch mechanism toward a locked position to inhibit movement of the rear mounting unit with respect to the seat track, wherein the biasing member is coupled to the second bracket.

20. The seat assembly of claim 11 further comprising a second seat track, a second rear mounting unit that is moveably disposed on the second seat track, and a connecting tube that extends from the rear mounting unit to the second rear mounting unit to help synchronize movement of the rear mounting unit and the second rear mounting unit along the seat track and the second seat track, respectively, and wherein the seat bottom has a rear member that extends between a pair of side members that are pivotally coupled to the seat back, wherein the latch mechanism secures the rear member to the connecting tube to inhibit pivoting of the seat back with respect to the seat bottom.

* * * * *